United States Patent
Jönsson et al.

(10) Patent No.: US 10,524,210 B2
(45) Date of Patent: Dec. 31, 2019

(54) POWER ADJUSTMENT OF A RADIO HEAD OF AN INDOOR RADIO SYSTEM

(71) Applicant: Telefonaktiebolaget LM Ericsson (publ), Stockholm (SE)

(72) Inventors: Tomas Jönsson, Luleå (SE); Kjell Larsson, Luleå (SE); Arne Simonsson, Gammelstad (SE); Johan Söder, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/759,551

(22) PCT Filed: Oct. 28, 2015

(86) PCT No.: PCT/SE2015/051137
§ 371 (c)(1),
(2) Date: Mar. 13, 2018

(87) PCT Pub. No.: WO2017/074231
PCT Pub. Date: May 4, 2017

(65) Prior Publication Data
US 2018/0242258 A1   Aug. 23, 2018

(51) Int. Cl.
*H04W 52/14* (2009.01)
*H04W 24/02* (2009.01)
*H04W 52/24* (2009.01)

(52) U.S. Cl.
CPC .......... *H04W 52/14* (2013.01); *H04W 24/02* (2013.01); *H04W 52/242* (2013.01); *H04W 52/245* (2013.01)

(58) Field of Classification Search
CPC ..... H04W 52/04; H04W 52/18; H04W 52/24; H04W 52/241; H04W 52/242; H04W 52/243; H04W 52/244; H04W 52/26; H04W 52/38; H04W 4/043; H04W 64/00; H04W 4/023; H04W 16/20; H04W 24/02; (Continued)

(56) References Cited

U.S. PATENT DOCUMENTS 8,971,949 B2    3/2015  Michel et al.
2013/0237227 A1*  9/2013  Nagaraja ............... H04W 16/10
                                                          455/436
2013/0237245 A1    9/2013  Tinnakornsrisuphap et al.
(Continued)

OTHER PUBLICATIONS

Ho, M-J., et al., "Sensor Network Controlled Indoor Cognitive Radio Systems," Proceedings of telecommunication networks and applications conference (ATNAC), 2012 Australasion, Nov. 7, 2012, pp. 1-6.
(Continued)

*Primary Examiner* — Philip Sobutka
(74) *Attorney, Agent, or Firm* — Sage Patent Group

(57) ABSTRACT

There is provided a method and corresponding devices for enabling power adjustment of a radio head of an indoor radio system. Basically, the method comprises identifying (S1), based on signal strength measurements in relation to wireless communication 5 devices connected to the radio head, presence of a wall of a building in which the indoor radio system is located, and triggering (S2) an adjustment of transmit power of the radio head to align the radio head coverage with the wall.

18 Claims, 12 Drawing Sheets

(58) Field of Classification Search
CPC ... H04W 4/04; H04W 84/045; H04W 52/245; H04W 52/247
USPC ........................................................ 455/522
See application file for complete search history.

(56) References Cited

U.S. PATENT DOCUMENTS

2015/0172935 A1    6/2015  Ho et al.
2017/0055131 A1*   2/2017  Kong .................... H04W 4/027

OTHER PUBLICATIONS

Landstrom, A., "Master Thesis Report: Indoor mobile classification and coverage analysis," Lulea University of Technology, MSc Programmes in Engineering, Department of Mathematics, Nov. 1, 2009, pp. 1-58.
Jinyeol Roh, et al., "Adaptive In-building Propagation Simulator Using Ray Tracing in WCDMA Networks", TENCON 2008-2008, IEEE Region 10 Conference, IEEE, Piscataway, NJ, Nov. 19, 2008, pp. 1-5, XP031414273.

\* cited by examiner

SIGNAL STRENGTH

DISTANCE

POWER ADJUSTMENT OF A RADIO HEAD OF AN INDOOR RADIO SYSTEM

TECHNICAL FIELD

The proposed technology generally relates to wireless communications technology, and more specifically to a method for enabling power adjustment of a radio head of an indoor radio system, a device configured to enable power adjustment of a radio head of an indoor radio system, a corresponding network device, indoor radio system, computer program and computer program product as well as an apparatus for enabling power adjustment of a radio head of an indoor radio system.

BACKGROUND

Indoor radio systems have been used since the first generation of cellular systems to compensate for coverage holes where the outdoor macro network cannot reach the users located inside buildings.

Today, indoor deployments are becoming increasingly popular since the macro networks are capacity limited as a result of the exponential traffic growth, or the outdoor cells do not provide the needed coverage for the requested bitrates. That is, even if users inside a building can be reached, the macro cell (or cells) covering the building may be limited in capacity, so to provide the promised capacity an indoor radio system must be installed.

FIG. 1 is a schematic diagram illustrating an example of a wireless communication context including an outdoor domain and an indoor domain in which wireless communication devices 30 are located. An indoor radio system 10 is responsible for serving wireless communication devices 30 in the indoor domain using one or more radio heads 15. A base station 20 is configured to provide one or more macro cells for serving wireless communication devices 30 in the outdoor domain, and possibly also in the indoor domain. The indoor radio head coverage may also extend to the outdoor domain, which will be discussed later on.

There exists a variety of indoor radio systems, also sometimes referred to as In-Building Systems, IBS, for deployment of antennas indoor.

Distributed Antenna Systems, DAS, have been the most common solution. In an active DAS, the antenna points include means for amplifying the signal, and in some cases also for translating the signal to a different frequency. This frequency can be both lower and higher than the original frequency. In an active DAS based on fiber-optical repeaters, the signal is transformed into an optical signal that is transmitted over low loss optical fibers to a central point where the signal is converted back to Radio Frequency, RF, and subsequently digitalized and down-converted to baseband. RF signals from multiple antenna points are, typically passively, combined at the central point.

Another solution, introduced by the Ericsson Radio Dot System, RDS, involves down-converting the signal to Intermediate Frequency, IF, and transmitting with low loss over CAT cables. (Passive) combination of signals from multiple antenna points can be done on IF. Common for all active DAS implementations is that it might be possible to tag the signals received from different antenna points with information identifying which antenna point it is transmitted (received) from. Different methods for doing so are known in the art.

The RDS system is in one perspective a complete radio base station with split architecture, but can also be seen as one type of active DAS, with integrated antenna(s) in the remote unit.

FIG. 2 is a schematic diagram illustrating a non-limiting example of an indoor radio system. In this particular example, the indoor radio system 10 comprises a Base Band Unit, BBU, 11 and Indoor Radio Unit, IRU, 13, and one or more radio heads 15 having one or more associated antennas. The radio head 15 or dot is the remote unit with integrated antenna. In a RDS system, the IRU is the head end interfacing the radio head or dot over CAT cable. The IRU may be connected to the BBU, through a CPRI interface.

FIG. 3 is a schematic diagram illustrating an example of the coverage area of an indoor radio system having multiple radio heads. In this example, the overall radio coverage of an indoor radio system is built up from the radio head coverage of multiple radio heads 15-1 to 15-5.

When deploying an indoor radio system, such as an RDS, the most common goal is to cover all users located inside the building, and no users outside of the building. This can be achieved through a combination of thorough pre-planning of system deployment followed by reconfiguration of system parameters based on measurements/tests in and around the building after the installation is completed. Such planning and, especially, testing and tuning is however time consuming and costly, and most of the time beyond the budget for such an installation. A normal installation consists of a rough dimensioning followed by a quick verification of the performance inside the building. To avoid having to reconfigure the system, the system is often over-dimensioned in terms of output power and node density, leading to a coverage area including also the outdoor surroundings of the building.

Radio coverage outside the building can sometimes result in unwanted behavior and negative consequences. By way of example, if a street is covered, cars passing by may handover to the RDS system and then back to the macro network. Handover can have impact on user quality experience and even lead to dropped calls. Also, positioning of emergency calls may faulty indicate the call being inside the building instead of outside the building.

Reference [1] relates to setting a transmit power of a femto cell depending on received power of at least one neighboring macro cell.

SUMMARY

It is a general object to enable improvements of radio head coverage for an indoor radio system.

It is an object to provide a method for enabling power adjustment of a radio head of an indoor radio system.

It is also an object to provide a device configured to enable power adjustment of a radio head of an indoor radio system.

Another object is to provide a network device comprising such a device.

Yet another object is to provide an indoor radio system comprising such a device.

Still another object is to provide a corresponding computer program and computer-program product.

It is also an object to provide an apparatus for enabling power adjustment of a radio head of an indoor radio system.

These and other objects are met by at least one of the embodiments of the proposed technology.

According to a first aspect, there is provided a method for enabling power adjustment of a radio head of an indoor radio system. The method comprises identifying, based on signal strength measurements in relation to wireless communication devices connected to the radio head, presence of a wall of a building in which the indoor radio system is located. The method also comprises triggering an adjustment of transmit power of the radio head to align the radio head coverage with the wall.

According to a second aspect, there is provided a device configured to enable power adjustment of a radio head of an indoor radio system,
  wherein said device is configured to identify, based on signal strength measurements in relation to wireless communication devices connected to the radio head, presence of a wall of a building in which the indoor radio system is located; and
  wherein said device is configured to trigger an adjustment of transmit power of the radio head to align the radio head coverage with the wall.

According to a third aspect, there is provided a network device comprising a device of the second aspect.

According to a fourth aspect, there is provided an indoor radio system comprising a device of the second aspect.

According to a fifth aspect, there is provided a computer program comprising instructions, which when executed by at least one processor cause the at least one processor to:
  identify, based on signal strength measurements in relation to wireless communication devices connected to a radio head of an indoor radio system, presence of a wall of a building in which the indoor radio system is located; and
  trigger an adjustment of transmit power of the radio head to align the radio head coverage with the wall.

According to a sixth aspect, there is provided a computer-program product comprising a computer-readable medium having stored thereon a computer program of the fifth aspect.

According to a seventh aspect, there is provided an apparatus for enabling power adjustment of a radio head of an indoor radio system. The apparatus comprises an identification module for identifying, based on signal strength measurements in relation to wireless communication devices connected to the radio head, presence of a wall of a building in which the indoor radio system is located. The apparatus also comprises a trigger module for triggering an adjustment of transmit power of the radio head to align the radio head coverage with the wall.

In this way, it is possible to enable improvements of radio head coverage for an indoor radio system, and especially to align the radio head coverage with a wall of a building in which the indoor radio system is located. By way of example, it is possible to provide indoor coverage but not outdoor coverage.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
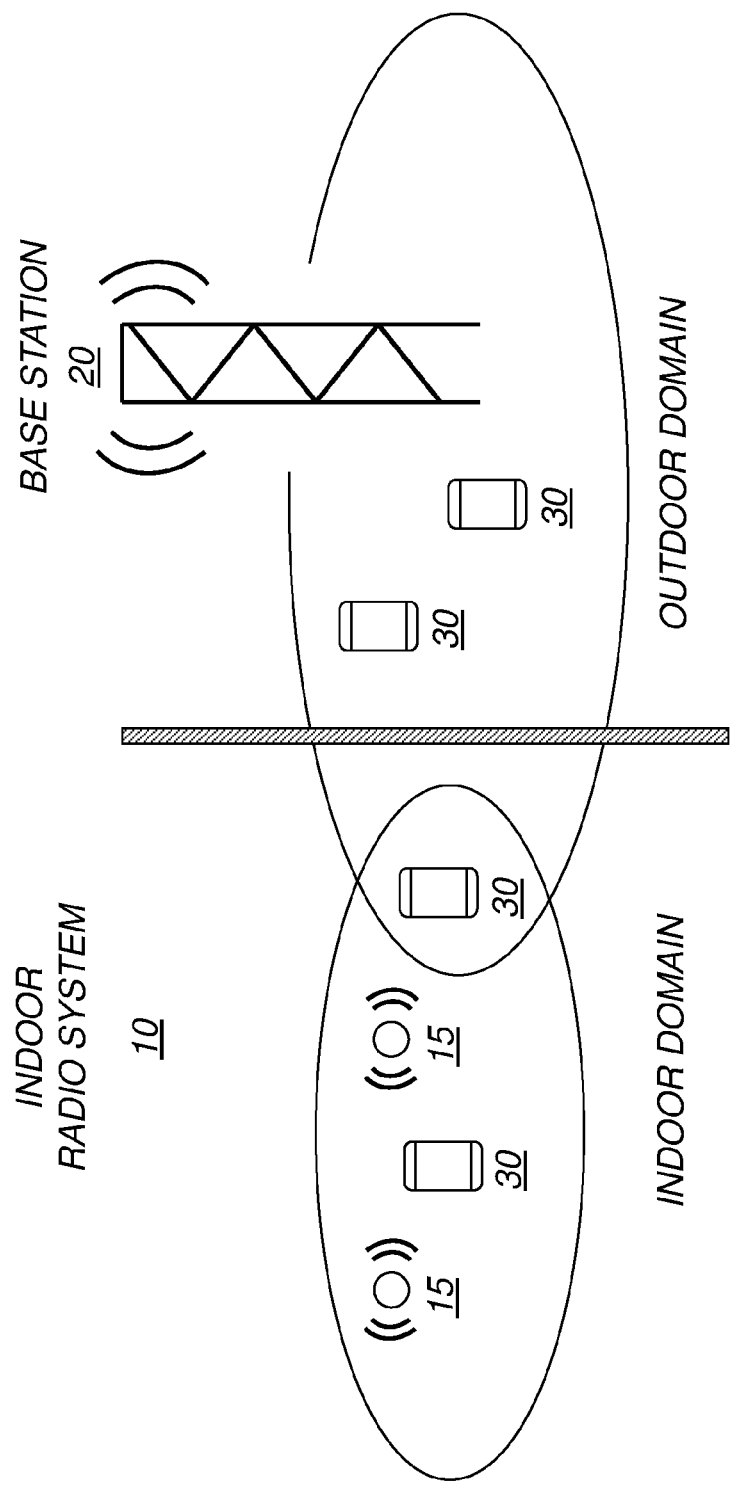
FIG. 1 is a schematic diagram illustrating an example of a wireless communication context including an outdoor domain and an indoor domain.
Figure 2:
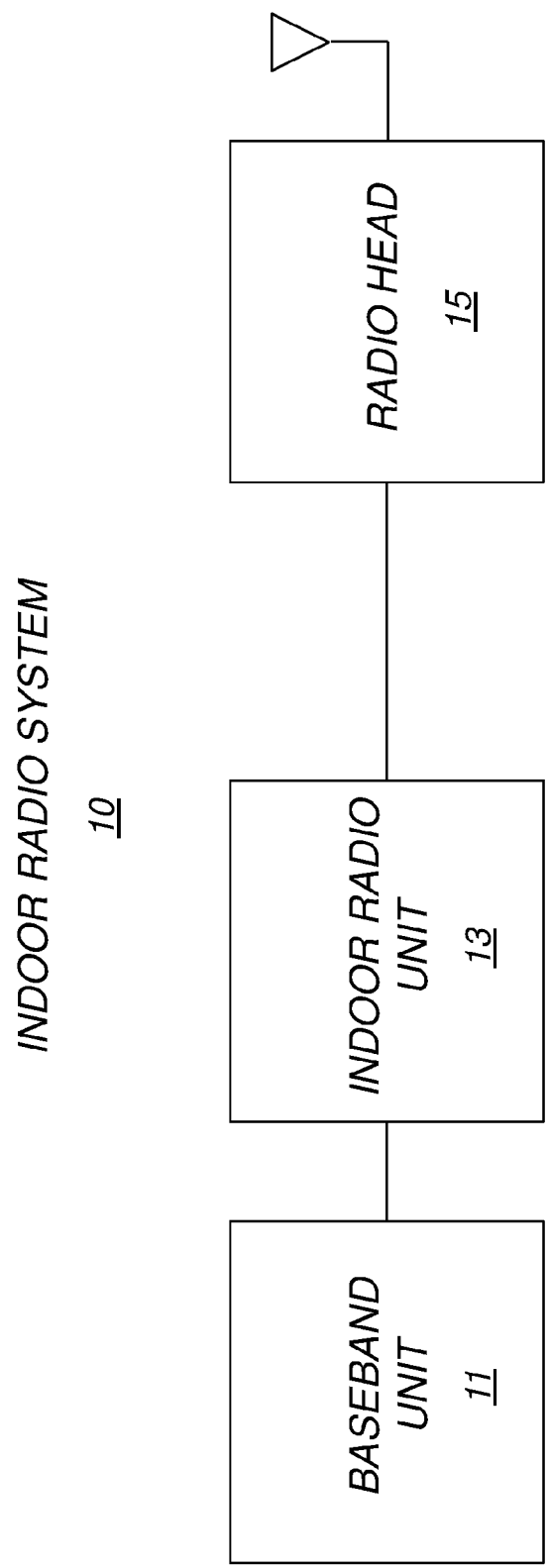
FIG. 2 is a schematic diagram illustrating a non-limiting example of an indoor radio system.
Figure 3:
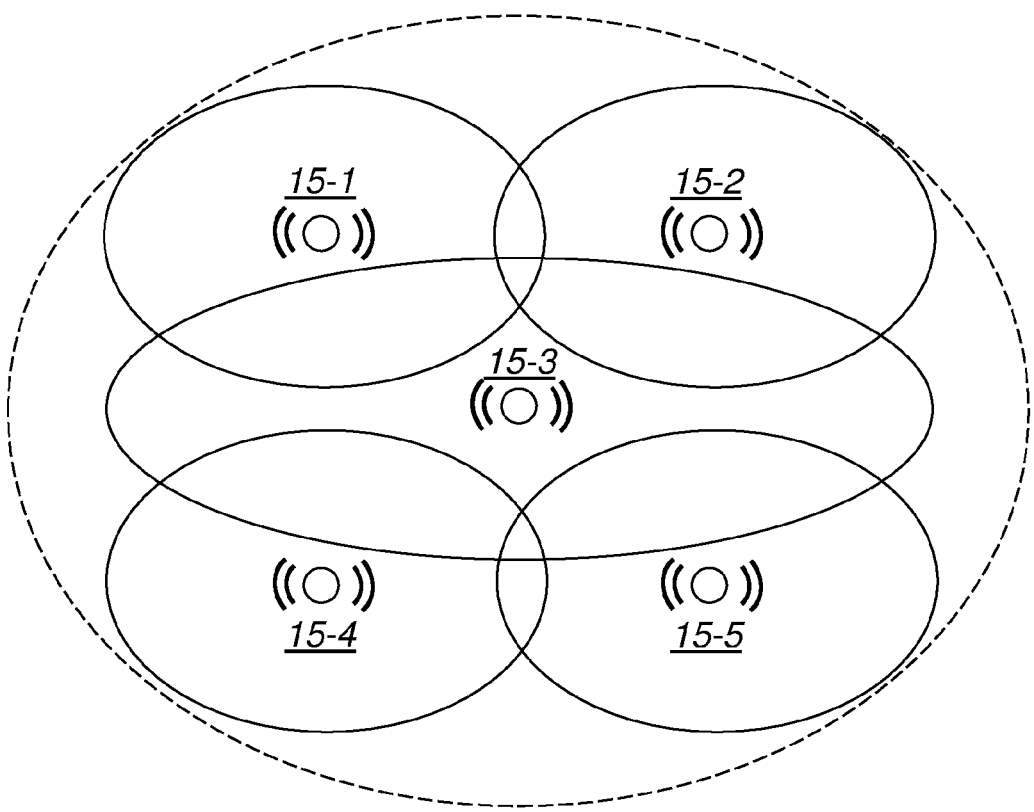
FIG. 3 is a schematic diagram illustrating an example of the coverage area of an indoor radio system having multiple radio heads.
Figure 4:
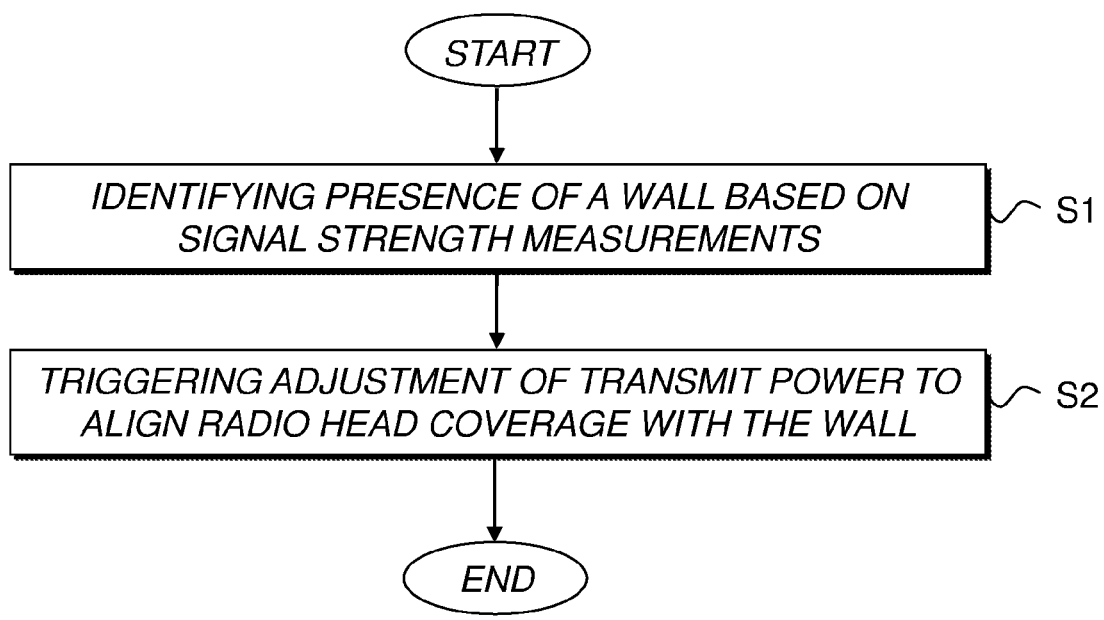
FIG. 4 is a schematic flow diagram illustrating an example of a method for enabling power adjustment of a radio head of an indoor radio system according to an embodiment.

FIG. 4 is a schematic flow diagram illustrating an example of a method for enabling power adjustment of a radio head of an indoor radio system according to an embodiment.

Basically, the method comprises:
S1: identifying, based on signal strength measurements in relation to wireless communication devices connected to the radio head, presence of a wall of a building in which the indoor radio system is located; and
S2: triggering an adjustment of transmit power of the radio head to align the radio head coverage with the wall.

In this way, it is possible to enable improvements of radio head coverage for an indoor radio system, and especially to align the radio head coverage with a wall of a building in which the radio door system is located.

Reference [1] sets power related to macro signal strength rather than the building structure and outer walls. The cell edge will not target the wall and the indoor cell will not cover the building specifically.

In a particular example, when the indoor radio system comprises at least two radio heads, the identifying and triggering may be performed per radio head.

By way of example, the adjustment of transmit power is triggered to provide indoor coverage but not outdoor coverage. This means that the unwanted behavior and negative consequences of radio coverage outside the building can be eliminated or at least alleviated.

As an example, the signal strength measurements include uplink signal strength measurements and/or downlink signal strength measurements or path loss measurements, related to the radio head. For example, the uplink signal strength of transmissions from wireless communication devices connected to the radio head may be measured in the radio head and used, or the downlink signal strength of transmissions from the radio head experienced by the wireless communication devices may be measured and reported for use in identifying the presence of the wall.

Path loss can be a used measure if transmission power is known, such as for example used and defined in 3GPP for LTE UEs.

Figure 5A:
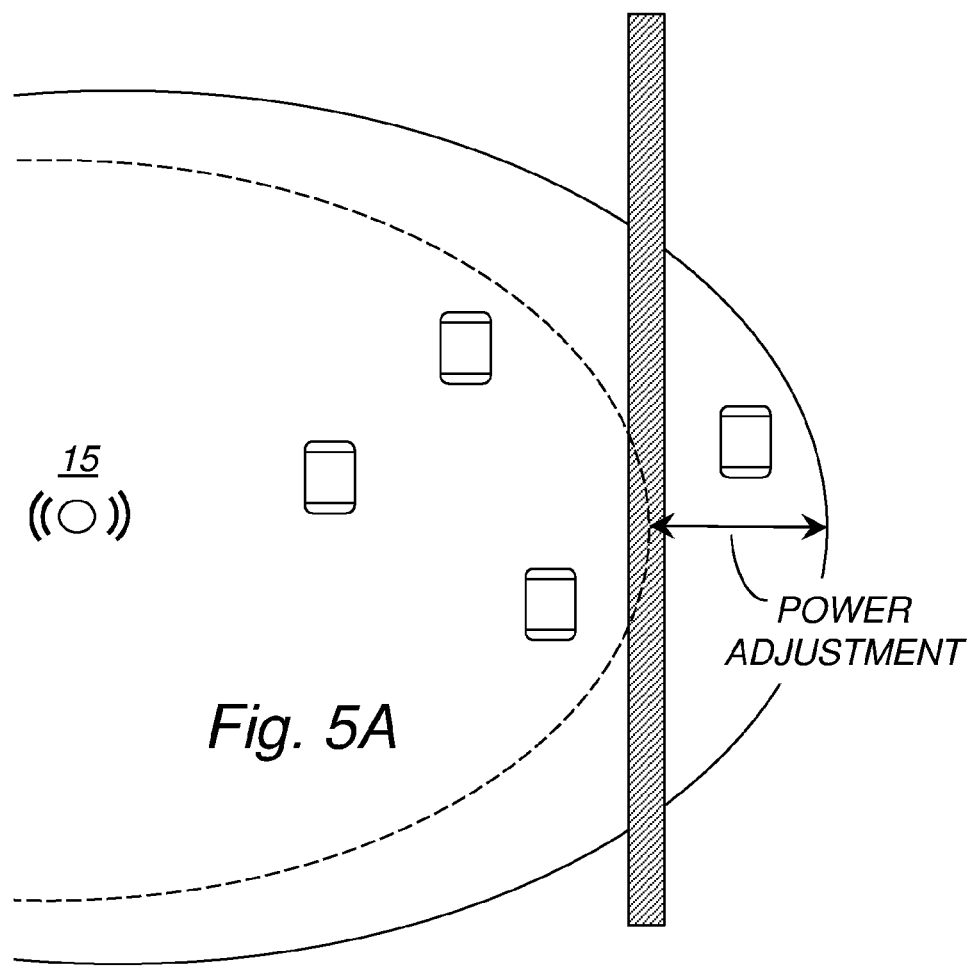
FIG. 5A is a schematic diagram illustrating an example of an initial coverage area of a radio head of an indoor radio system extending to the outdoor domain and a subsequent power adjustment to align the radio head coverage with the wall.

FIG. 5A is a schematic diagram illustrating an example of an initial coverage area of a radio head 15 of an indoor radio system extending to the outdoor domain and a subsequent power adjustment to align the radio head coverage with the wall.

Figure 5B:
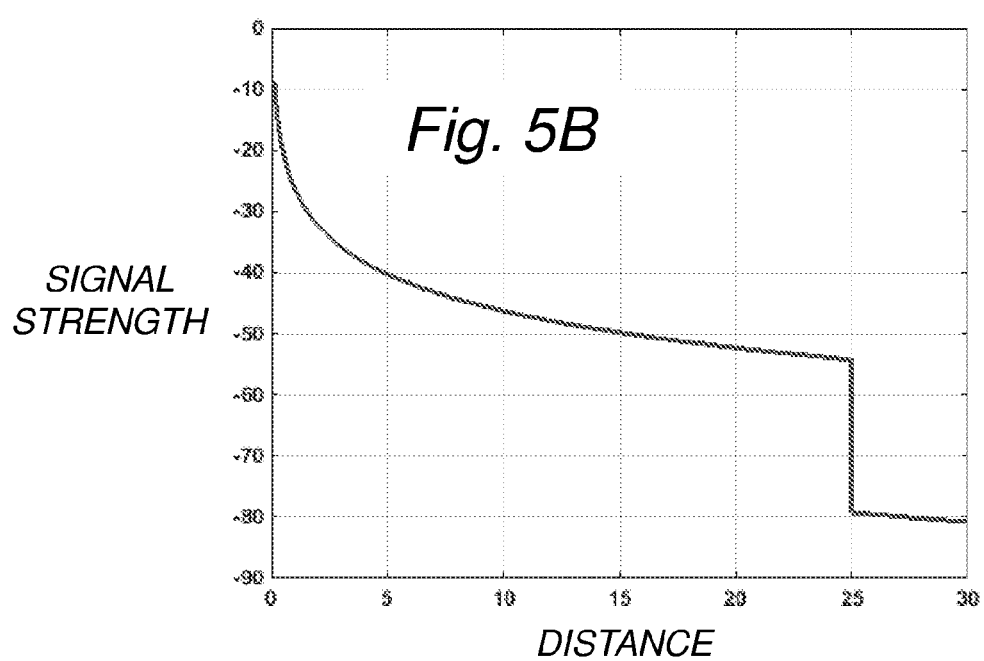
FIG. 5B is a schematic diagram illustrating an example of a curve diagram relating received signal strength to the distance from the radio head, corresponding to the example of FIG. 5A.

FIG. 5B is a schematic diagram illustrating an example of a curve diagram relating received signal strength to the distance from the radio head, corresponding to the example of FIG. 5A. In this particular example, the wall loss, i.e. the signal attenuation caused by the wall, is seen as the signal strength drop at distance 25 (m).

In a particular example, a statistical distribution is created based on the signal strength measurements, and a location of the wall is identified in the statistical distribution.

For example, the wall may be identified from less frequent levels of signal strength in the statistical distribution.

The adjustment of transmit power may be determined based on the location of the wall in the statistical distribution.

As an example, a histogram may be created to represent the distribution of signal strength measurements. It should though be understood that other equivalent or similar statistical distributions such as the Cumulative Distribution Function, CDF, may be used.

Figure 6A:
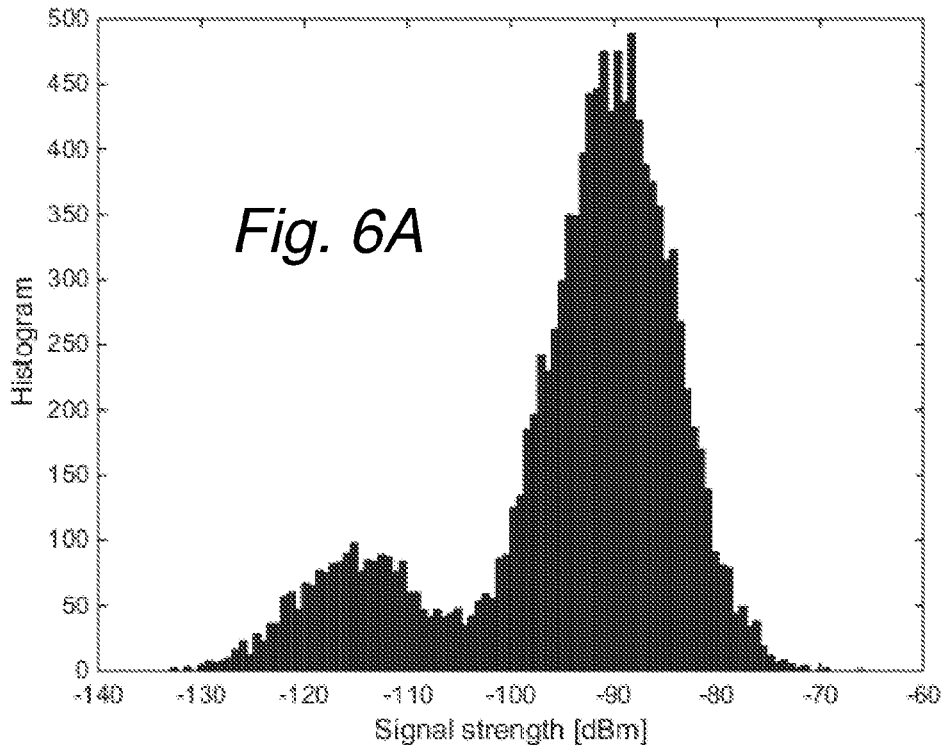
FIG. 6A is a schematic diagram illustrating an example of a signal strength histogram.

FIG. 6A is a schematic diagram illustrating an example of a signal strength histogram. In this example, the wall is located within the radio head coverage, and the location of the wall can be identified in the statistical distribution, e.g. as a drop or valley in the middle of the histogram. More specifically the location of the wall can be identified from the less frequent levels of signal strength, disregarding the edges of the distribution. The histogram illustrates the situation of an unoptimized coverage, where the indoor coverage actually extends into the outdoor domain. A power adjustment to align the radio head coverage with the wall is thus desirable to provide for a more optimized coverage.

Figure 6B:
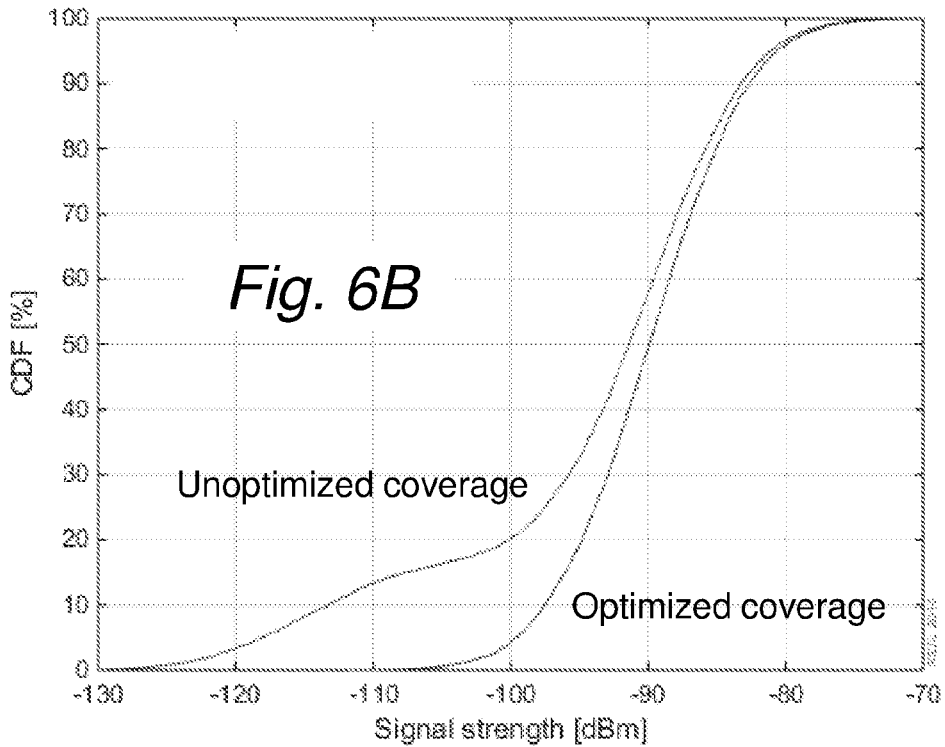
FIG. 6B is a schematic diagram illustrating an example of Cumulative Distribution Function, CDF, curves for unoptimized coverage and optimized coverage, respectively, wherein the curve related to unoptimized coverage corresponds to the signal strength histogram of FIG. 6A.

FIG. 6B is a schematic diagram illustrating an example of Cumulative Distribution Function, CDF, curves for unoptimized coverage and optimized coverage, respectively, wherein the curve related to unoptimized coverage corresponds to the signal strength histogram of FIG. 6A. In the CDF distribution of FIG. 6B, the wall can be identified as a knee or thigh in the curve related to unoptimized coverage.

For example, Discriminant Function Classification may be used to identify the location of the wall, e.g. by using a discriminator function such as the Fischer function to find a dividing point or border between two sets or groups of signal strength values within the distribution. For more information on Discriminant Function Classification, reference can be made to [2].

In another set of examples, the wall may be identified also based on signal strength measurements related to at least one other cell.

By way of example, the wall may be identified based on a geometry measure defined as a relation between signal strength related to the radio head and signal strength of at least one other cell.

For example, the wall may be identified based on a geometry measure defined as i) signal strength related to the radio head divided by signal strength of the strongest outdoor cell, or ii) signal strength related to the radio head divided by the sum of all other signal strengths.

In linear scale, geometry is considered as a ratio, whereas in logarithmic scale (dB), geometry is normally defined as a difference. Both ways of considering geometry are equivalent.

Alternatively, the signal strength related to the radio head and the signal strength related to the other cell or cells may be used individually, without forming a geometry measure. For example, by applying a discriminator function such as the Fischer function for each dimension, treating signal strength related to the radio head and signal strength related to the other cell(s) individually.

Typically, the adjustment of transmit power may be determined to locate an edge of the radio head coverage on either side of the wall, or within the wall.

Preferably, the wall is an outer wall of the building, although it is in principle also possible to consider a thicker inner wall of the building or other obstacles, building structures or similar structures attenuating the radio signal and desired to be used as a border (wall) between (indoor and outdoor) cells.

For a better understanding, the proposed technology will now be described with reference to a few non-limiting examples. It should though be understood that the proposed technology is not limited thereto.

In a particular example, it is desirable to find the outer wall loss based on statistical signal strength measures per radio head/access point/dot/antenna point and adjust individual radio head power to cover indoor but not outdoor.

With the proposed solution, users in the building where the indoor radio system is installed will experience superior performance and maximum capacity increase, while the installation will both be simpler and less costly.

Furthermore, users outside of the targeted building will not experience degraded performance caused by ending up on the cell-edge between the indoor system and the outdoor, macro system.

The network will further benefit since unnecessary handovers back and forth between the indoor system and the outdoor system for users passing by the building can be avoided, removing unnecessary signaling load and avoiding handover interruptions in the service for these users.

Positioning by cell identity will more likely separate outdoor from indoor.

In a particular example, the proposed solution targets to adjust the output power of each radio head/access point/dot/ antenna point so that the cell border between the indoor system and the outdoor network is located in the outer wall of the building or in the vicinity of the wall.

By way of example, the method may be performed in the BBU, IRU or in each concerned radio head/access point/dot/antenna point. In the case the method is performed in the BBU, a power adjustment command is sent from the BBU to the radio head/access point/dot/antenna point. If the method is performed in the radio head/access point/dot/antenna point, measurements/reports received in the BBU may have to be signaled to the radio head/access point/dot/antenna point.

The method may also be performed in a network device, which may be located outside of the radio access network, e.g. in the core network, an OSS system or a cloud-based network environment.

In a non-limiting example, the procedure starts at maximum output power. To determine whether the outdoor wall is located within the coverage area of the radio head/access point/dot/antenna point, signal strength measurements related to the radio head/access point/dot/antenna point are obtained. For example, these may be achieved through reported downlink signal strengths from the connected UEs, or by uplink signal strength measurements at the radio head/access point/dot/antenna point.

UE reports that may be used for this purpose are for example RSRP reports for LTE, RSCP for WCDMA and RxLev for GSM.

The received UL signal strength may for example be measured directly on certain channels. For uplink signal strength measured on power controlled channels the transmit power level may need to be compensated. LTE with fractional power control is well suited, where a knee in the received signal strength distribution will remain even without compensating for the transmit power. Once a sufficient number of signal strength measurements have been obtained or collected a distribution such as a histogram or equivalent distribution is created.

Figure 7:
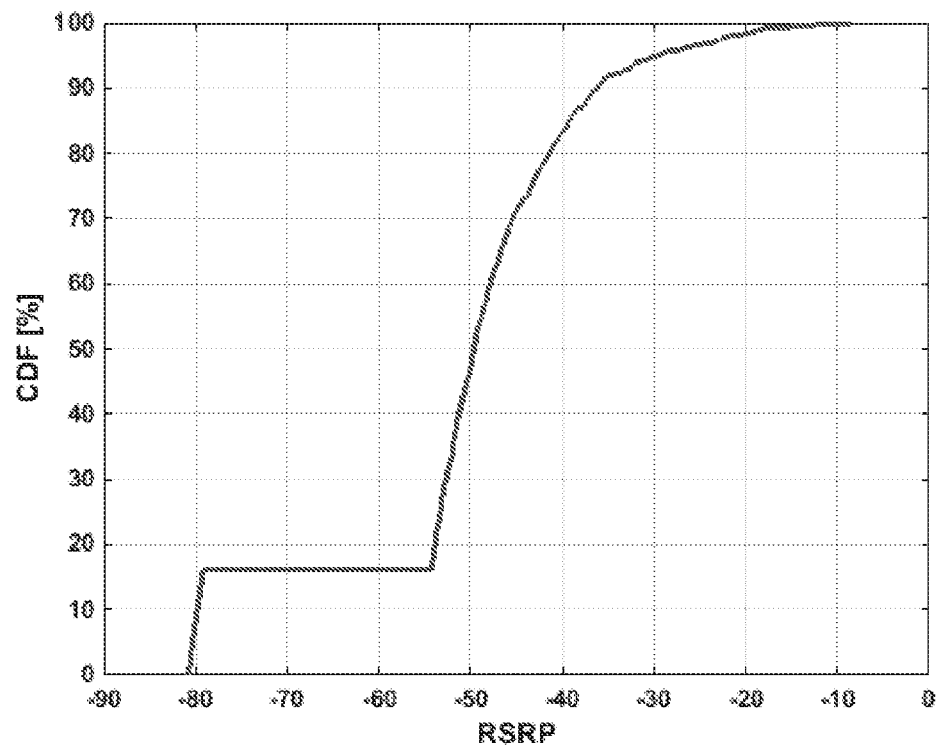
FIG. 7 is a schematic curve diagram illustrating a simplified example of a signal strength distribution.

FIG. 7 is a schematic curve diagram illustrating a simplified example of a signal strength distribution. If the outer wall is within the coverage area a sharp drop (a knee/thigh) will be present in the distribution, see FIG. 7. Assume, for example, that the outer wall attenuation is 25 dB, and that indoor users close to the outer wall has a received signal strength of −55 dBm. There will then exist no users with a signal strength between −55 and −80 dBm, and the users with signal strength below −80 dBm will be outside the building.

In a particular example, an embodiment of the proposed solution collects a number of signal strength values, creates a statistical distribution, detects presence of a wall and, in the case of detection, adjusts an emitted signal power based on the estimated location and thickness (in RF domain) of the wall.

In a non-limiting example, a flow-chart may be summarized as follows:
1. Signal strength is measured for mobiles connected to the radio head/access point/dot/antenna point.
2. Signal strength histograms are formed for each radio head/access point/dot/antenna point.
3. Least frequent bins are identified as a knee/thigh in the distribution.
4. The power of the radio head/access point/dot/antenna point is adjusted so that the cell edge corresponds to the identified knee/thigh.

If downlink signal strength is used as measured and reported RSRP from the UE in step 1, the signal strength can be associated to individual radio head/access point/dot/antenna point by measuring uplink and find the radio head/access point/dot/antenna point with highest signal strength.

As previously indicated, instead of a pure signal strength measure in step 1, a geometry measure can be used. For example, in log scale the geometry measure can be calculated as the signal strength of the radio head/access point/dot/antenna point minus the linear sum of all the other signal strengths, alternatively only minus the signal strength of the strongest outdoor (macro) cell.

The statistical distribution search for the wall loss knee/thigh in step 3 can be made more or less advanced, e.g. using Discriminant Function Classification.

If such a knee is found in the distribution, the signal strength at either side, i.e. just inside and just outside of the wall may be stored as S_inside and S_outside, respectively. For example, the target cell edge signal strength in the center of the wall may now be calculated as S_wall=(S_inside+S_outside)/2.

As an example, the adjustment in output power may now be obtained by:

$$\text{Delta}=S\_low-S\_wall,$$

where S_low is the lowest measured signal strength.

Alternatively, the adjustment may be defined as:

$$\text{Delta}=S\_low-S\_inside, \text{ or}$$

$$\text{Delta}=S\_low-S\_outside.$$

The new output power is then defined as:

$$P\_new=P\_old\pm\text{Delta}$$

As used herein, the non-limiting term "wireless communication device" may refer to User Equipment (UE), a mobile station, a mobile terminal, a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as a non-limiting term comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "indoor radio system" may refer to any radio access system adapted or suitable for an indoor environment, including but not limited to DAS, active DAS, optical repeater and RDS systems.

As used herein, the non-limiting term "radio head" may refer to any type of radio head or access point such as an antenna point, radio dot or other form of radio end-device coupled to one or more antennas.

As used herein, the term "network device" may refer to any device located in connection with a communication network, including but not limited to devices in radio access networks, core networks, Operation and Support Systems, OSS, and similar network structures. The term network device may also encompass cloud-based network devices.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect, there is provided a device 100; 200; 300; 400 configured to enable power adjustment of a radio head 15 of an indoor radio system 10. The device is configured to identify, based on signal strength measurements in relation to wireless communication devices connected to the radio head 15, presence of a wall of a building in which the indoor radio system 10 is located. The device is also configured to trigger an adjustment of transmit power of the radio head 15 to align the radio head coverage with the wall.

In a particular embodiment, the indoor radio system 10 comprises at least two radio heads, and the device is configured to identify a wall and trigger a corresponding power adjustment per radio head.

Preferably, the device may be configured to trigger an adjustment of transmit power to provide indoor coverage but not outdoor coverage.

By way of example, the device may be configured to operate based on uplink signal strength measurements and/or downlink signal strength measurements and/or path loss measurements, related to the radio head.

Path loss can be a used measure if transmission power is known, such as for example used and defined in 3GPP for LTE UEs.

As an example, the device may be configured to create a statistical distribution based on the signal strength measurements, and to identify a location of the wall in the statistical distribution.

In a particular example, the device is configured to identify the wall from less frequent levels of signal strength in the statistical distribution. In a histogram distribution, this may correspond to a valley in the "middle" of the distribution. Equivalently, this may be a knee/thigh in a CDF curve.

Typically, the device may be configured to determine the adjustment of transmit power based on the location of the wall in the statistical distribution.

In a complementary set of embodiments, the device may be configured to identify the wall also based on signal strength measurements related to at least one other cell.

For example, the device may be configured to identify the wall based on a geometry measure defined as a relation between signal strength related to the radio head and signal strength of at least one other cell.

As an example, the device may be configured to identify the wall based on a geometry measure defined as i) signal strength related to the radio head divided by signal strength of the strongest outdoor cell, or ii) signal strength related to the radio head divided by the sum of all other signal strengths. Other alternatives also exist, as previously mentioned.

Preferably, the device may be configured to determine the adjustment of transmit power to locate an edge of the radio head coverage on either side of the wall, or within the wall.

In a preferred example, the device is configured to identify presence of an outer wall of the building.

Figure 8:
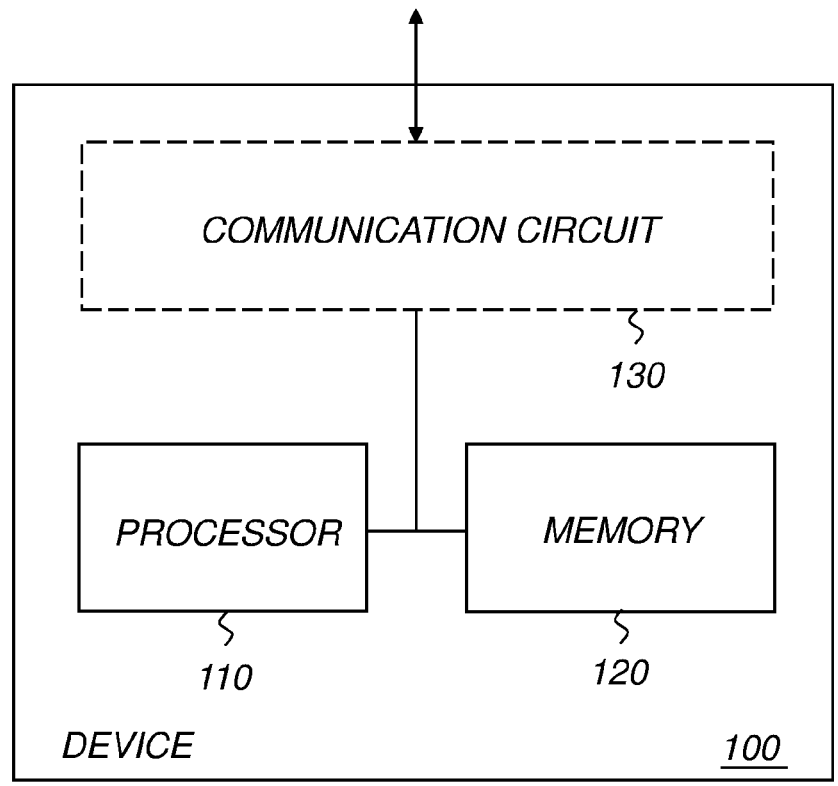
FIG. 8 is a schematic block diagram illustrating an example of a device, based on a processor-memory implementation, according to an embodiment.

FIG. 8 is a schematic block diagram illustrating an example of a device 100, based on a processor-memory implementation, according to an embodiment. In this particular example, the device 100 comprises a processor 110 and a memory 120, the memory 120 comprising instructions executable by the processor 110, whereby the processor is operative to identify presence of a wall of a building and trigger an adjustment of transmit power of the radio head 15 to align the radio head coverage with the wall.

Optionally, the arrangement/system 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

Figure 9:
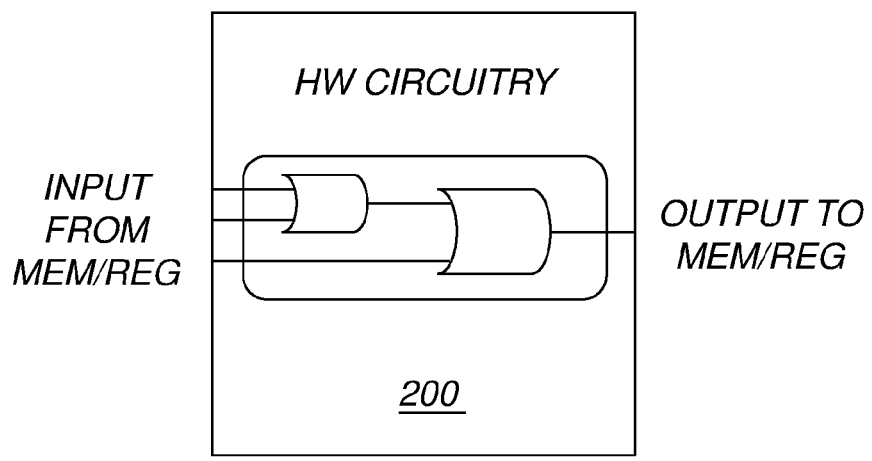
FIG. 9 is a schematic block diagram illustrating another example of a device, based on a hardware circuitry implementation, according to an embodiment

FIG. 9 is a schematic block diagram illustrating another example of a device 200, based on a hardware circuitry implementation, according to an embodiment. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM) to identify presence of a wall of a building and trigger an adjustment of transmit power of the radio head 15 to align the radio head coverage with the wall.

Figure 10:
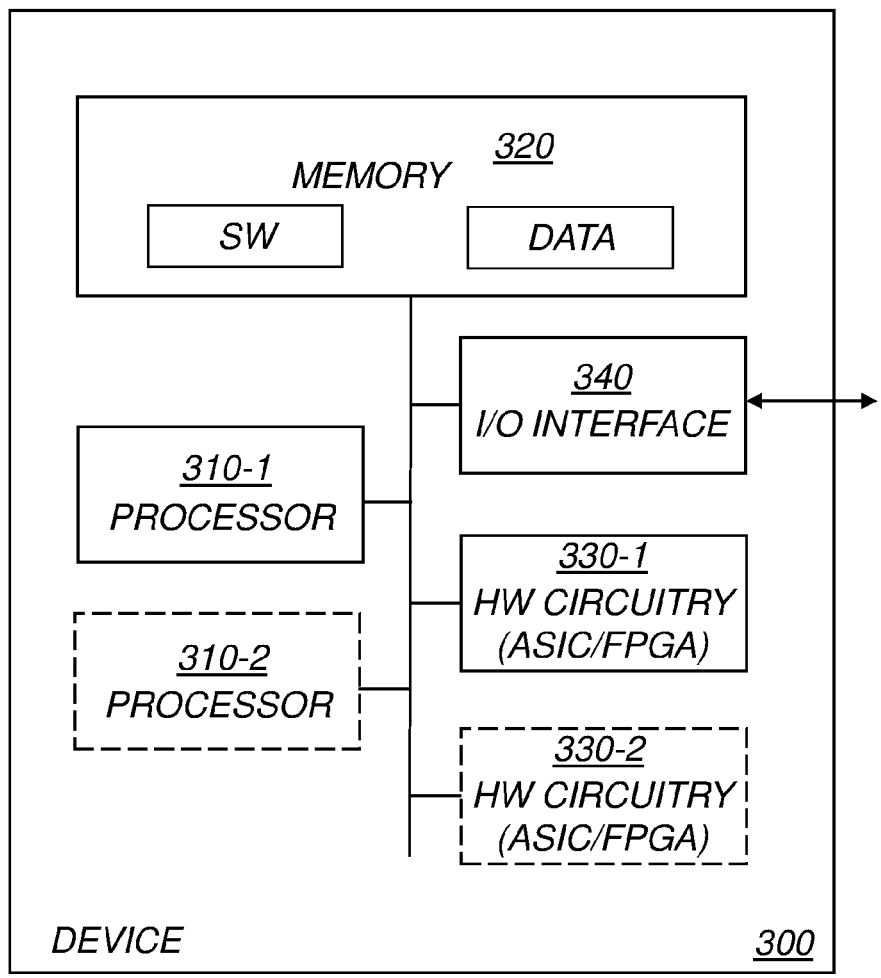
FIG. 10 is a schematic block diagram illustrating yet another example of a device, based on combination of both processor(s) and hardware circuitry in connection with suitable memory unit(s), according to an embodiment.

FIG. 10 is a schematic block diagram illustrating yet another example of a device 300, based on combination of both processor(s) 310-1, 310-2 and hardware circuitry 330-1, 330-2 in connection with suitable memory unit(s) 320. The device 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software, SW, for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Figure 11:
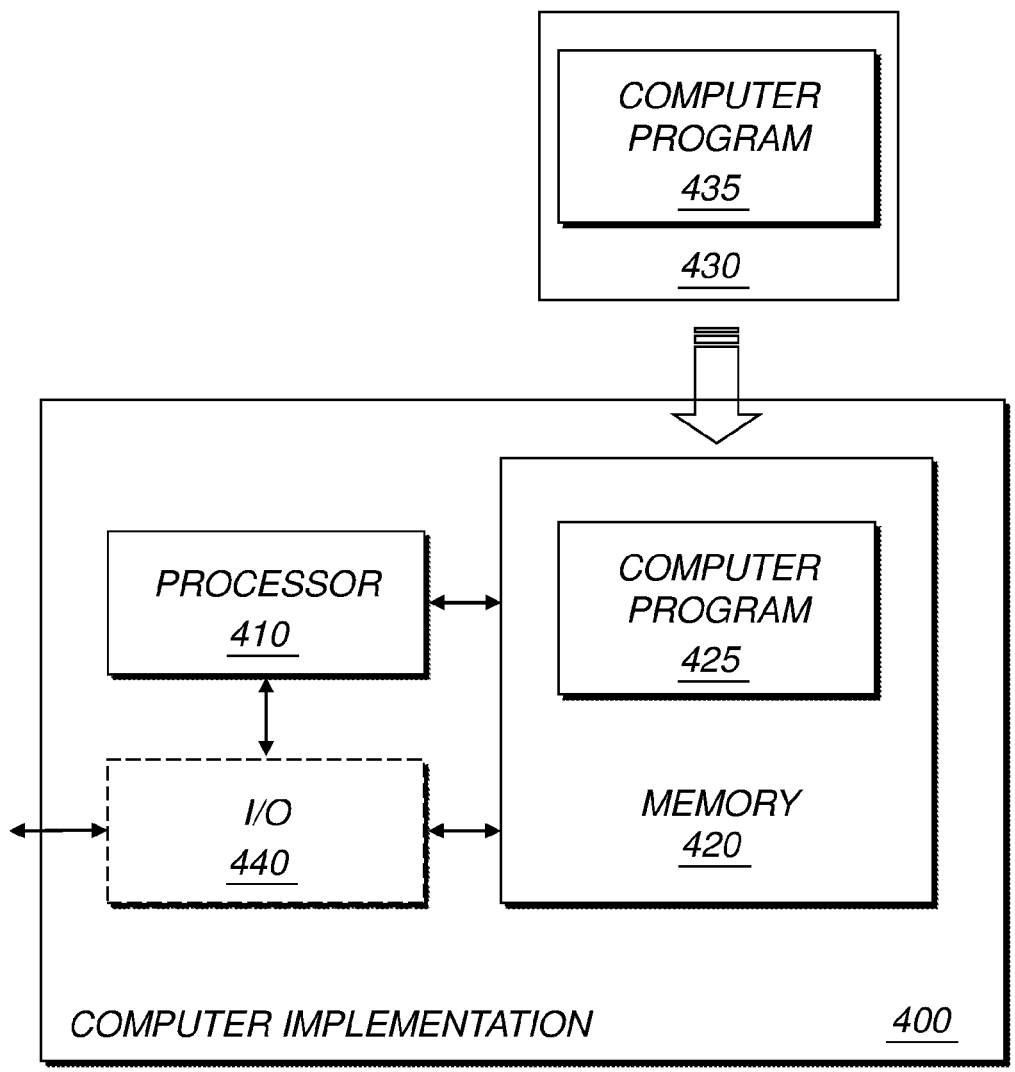
FIG. 11 is a schematic diagram illustrating an example of a computer-implementation according to an embodiment.

FIG. 11 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to:
  identify, based on signal strength measurements in relation to wireless communication devices connected to a radio head 15 of an indoor radio system 10, presence of a wall of a building in which the indoor radio system is located; and
  trigger an adjustment of transmit power of the radio head 15 to align the radio head coverage with the wall.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 12:
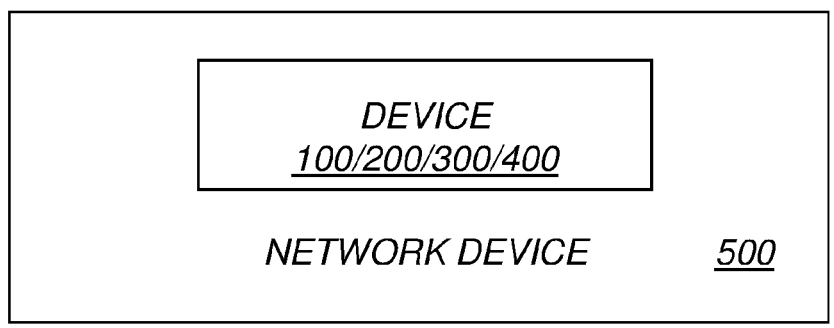
FIG. 12 is a schematic block diagram illustrating an example of a network device comprising a device according to any of the embodiments.

FIG. 12 is a schematic block diagram illustrating an example of a network device 500 comprising a device 100; 200; 300; 400 according to any of the embodiments.

By way of example, the network device 500 may be provided for location in a radio access network, a core network, an Operation and Support System, OSS, or a cloud-based network environment.

For example, the network device 500 may be a baseband unit 11 or an Indoor Radio Unit, IRU 13, and configured to send a power adjustment command to the radio head 15.

In another example, the network device 500 may be a radio head 15 configured to obtain signal strength measurements for identifying presence of a wall of a building. This would be a slightly more advanced radio head, with internal processing capabilities.

In fact, the network device may be any suitable network device in the wireless communication system, or a network device in connection with the wireless communication system.

In a particular example, the network device 500 may be a cloud-based network device.

There is also provided an indoor radio system 10 comprising a device 100; 200; 300; 400 as described herein.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 13:
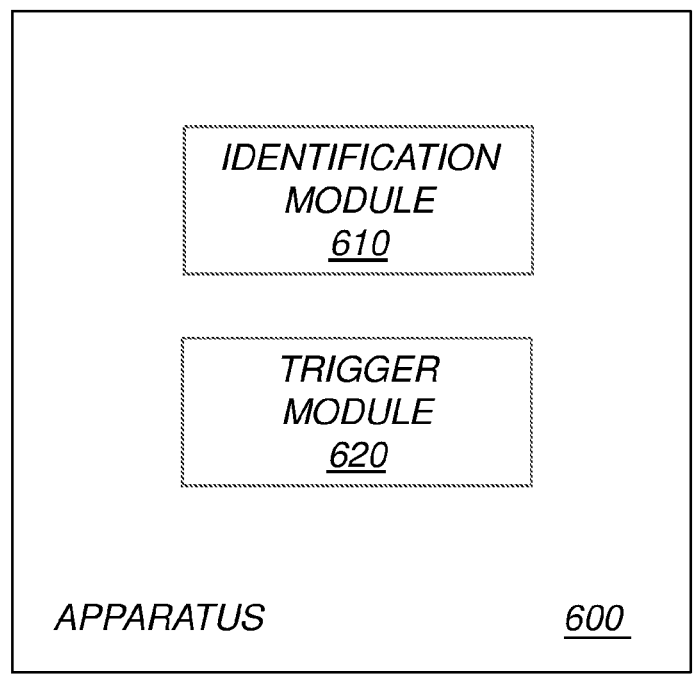
FIG. 13 is a schematic diagram illustrating an example of an apparatus for enabling power adjustment of a radio head of an indoor radio system according to an embodiment.

FIG. 13 is a schematic diagram illustrating an example of an apparatus for enabling power adjustment of a radio head of an indoor radio system according to an embodiment. The apparatus 600 comprises an identification module 610 for identifying, based on signal strength measurements in relation to wireless communication devices connected to the radio head, presence of a wall of a building in which the indoor radio system is located. The apparatus 600 also comprises a trigger module 620 for triggering an adjustment of transmit power of the radio head 15 to align the radio head coverage with the wall.

Alternatively it is possible to realize the module(s) in FIG. 13 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Figure 14:
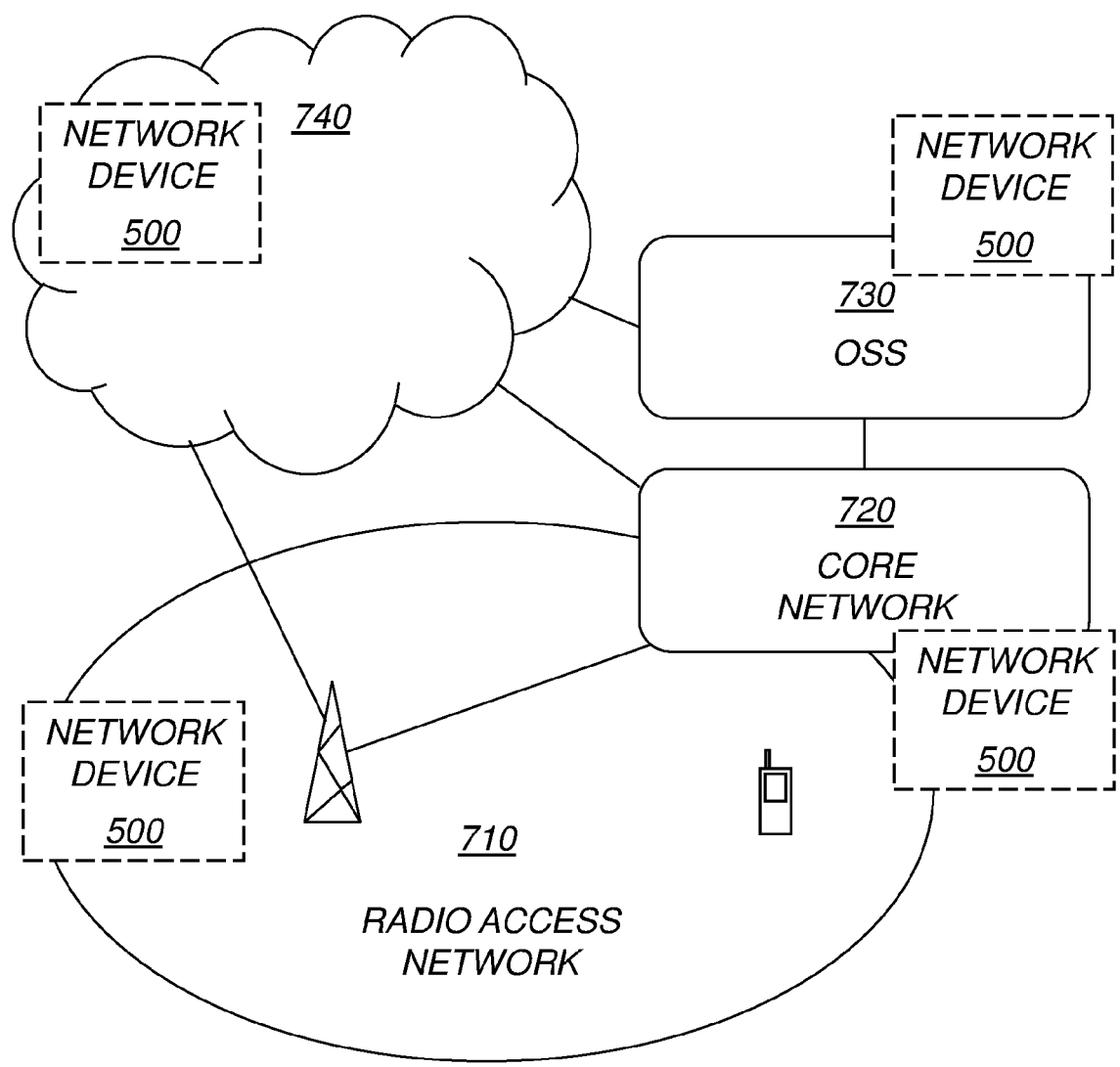
FIG. 14 is a schematic diagram illustrating an example of a wireless communication system, including a radio access network and/or a core network and/or an Operations and Support System (OSS), and/or a cloud-based network environment.

FIG. 14 is a schematic diagram illustrating an example of a wireless communication system, including a radio access network 710 and/or a core network 720 and/or an Operations and Support System (OSS), 730 and/or a cloud-based network environment 740.

In the example of FIG. 14, the network device 500 may be provided for location in the radio access network 710, the core network 720, the OSS system 730 or the cloud-based network environment 740, with suitable transfer of information to the radio access network for enabling the power adjustment of the radio head(s).

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in a so-called generic data centre, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed; cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] U.S. Pat. No. 8,971,949.
[2] Indoor mobile classification and indoor coverage analysis, by Anders Landström, Master Thesis Report, Luleå University of Technology, 2009.

The invention claimed is:

1. A method for enabling power adjustment of a radio head of an indoor radio system, the method comprising:
identifying, based on signal strength measurements in relation to wireless communication devices connected to the radio head, presence of a wall of a building in which the indoor radio system is located, wherein a statistical distribution is created based on the signal strength measurements, and a location of the wall is identified in the statistical distribution from less frequent levels of signal strength in the statistical distribution; and
triggering an adjustment of transmit power of the radio head to align the radio head coverage with the wall.

2. The method of claim 1, wherein the indoor radio system comprises at least two radio heads, and the identifying and triggering are performed per radio head.

3. The method of claim 1, wherein the adjustment of transmit power is triggered to provide indoor coverage but not outdoor coverage.

4. The method of claim 1, wherein the signal strength measurements include uplink signal strength measurements and/or downlink signal strength measurements and/or path loss measurements, related to the radio head.

5. The method of claim 1, wherein the adjustment of transmit power is determined based on the location of the wall in the statistical distribution.

6. The method of claim 1, wherein the wall is identified also based on signal strength measurements related to at least one other cell.

7. The method of claim 6, wherein the wall is identified based on a geometry measure defined as a relation between signal strength related to the radio head and signal strength of at least one other cell.

8. The method of claim 7, wherein the wall is identified based on a geometry measure defined as:
signal strength related to the radio head divided by signal strength of the strongest outdoor cell; or
signal strength related to the radio head divided by the sum of all other signal strengths.

9. A device configured to enable power adjustment of a radio head of an indoor radio system, the device comprising:
processing circuitry;
memory containing instructions executable by the processing circuitry whereby the device is operative to:
identify, based on signal strength measurements in relation to wireless communication devices connected to the radio head, presence of a wall of a building in which the indoor radio system is located, wherein a statistical distribution is created based on the signal strength measurements, and a location of the wall is identified in the statistical distribution from less frequent levels of signal strength in the statistical distribution; and
trigger an adjustment of transmit power of the radio head to align the radio head coverage with the wall.

10. The device of claim 9:
wherein the indoor radio system comprises at least two radio heads; and
wherein the instructions are such that the device is operative to identify a wall and trigger a corresponding power adjustment per radio head.

11. The device of claim 9, wherein the instructions are such that the device is operative to trigger an adjustment of transmit power to provide indoor coverage but not outdoor coverage.

12. The device of claim 9, wherein the instructions are such that the device is operative to operate based on uplink signal strength measurements and/or downlink signal strength measurements and/or path loss measurements, related to the radio head.

13. The device of claim 9, wherein the instructions are such that the device is operative to determine the adjustment of transmit power based on the location of the wall in the statistical distribution.

14. The device of claim 9, wherein the instructions are such that the device is operative to identify the wall also based on signal strength measurements related to at least one other cell.

15. The device of claim 14, wherein the instructions are such that the device is operative to identify the wall based on a geometry measure defined as a relation between signal strength related to the radio head and signal strength of at least one other cell.

16. The device of claim 15, wherein the instructions are such that the device is operative to identify the wall based on a geometry measure defined as:
signal strength related to the radio head divided by signal strength of the strongest outdoor cell; or
signal strength related to the radio head divided by the sum of all other signal strengths.

17. A network device, comprising:
a power adjustment device configured to enable power adjustment of a radio head of an indoor radio system;
the power adjustment device comprising:
processing circuitry;
memory containing instructions executable by the processing circuitry whereby the power adjustment device is operative to:
identify, based on signal strength measurements in relation to wireless communication devices connected to the radio head, presence of a wall of a building in which the indoor radio system is located, wherein a statistical distribution is created based on the signal strength measurements, and a location of the wall is identified in the statistical distribution from less frequent levels of signal strength in the statistical distribution; and trigger an adjustment of transmit power of the radio head to align the radio head coverage with the wall.

18. The network device of claim 17:
wherein the network device is a baseband unit or an Indoor Radio Unit; and
wherein the instructions are such that the power adjustment device is operative to send a power adjustment command to the radio head.

* * * * *